United States Patent [19]

Ulrich

[11] 4,096,876
[45] Jun. 27, 1978

[54] CONDENSATE CONTROLLER

[75] Inventor: Otho E. Ulrich, Three Rivers, Mich.

[73] Assignee: Armstrong Machine Works, Three Rivers, Mich.

[21] Appl. No.: 702,150

[22] Filed: Jul. 2, 1976

[51] Int. Cl.² ............................................ F16T 1/30
[52] U.S. Cl. .................................... 137/185; 137/190
[58] Field of Search ............... 137/185, 179, 180, 186

[56] References Cited

U.S. PATENT DOCUMENTS

| 1,309,604 | 7/1919 | Armstrong | 137/185 |
| 1,787,465 | 1/1931 | Armstrong | 137/185 |
| 3,842,856 | 10/1974 | Asfura | 137/185 X |

Primary Examiner—Alan Cohan

Attorney, Agent, or Firm—Blanchard, Flynn, Thiel, Boutell & Tanis

[57] ABSTRACT

A condensate controller comprising an inverted bucket steam trap having a blow-thru tube for continuously discharging non-condensable gas, flash steam and perhaps a limited amount of live steam, at a controlled rate. The condensate controller has a chamber located below and isolated from the compartment in which the inverted bucket is located. The chamber receives the incoming condensate and vapor from the inlet pipe so that the condensate level in the inlet pipe can be lowered and so that pressure surges in the inlet pipe can be cushioned and absorbed. The blow-thru pipe has a concavo-convex deflector for improving the separation of liquid from the vapor that flows through the blow-thru conduit.

5 Claims, 1 Drawing Figure

U.S. Patent   June 27, 1978   4,096,876
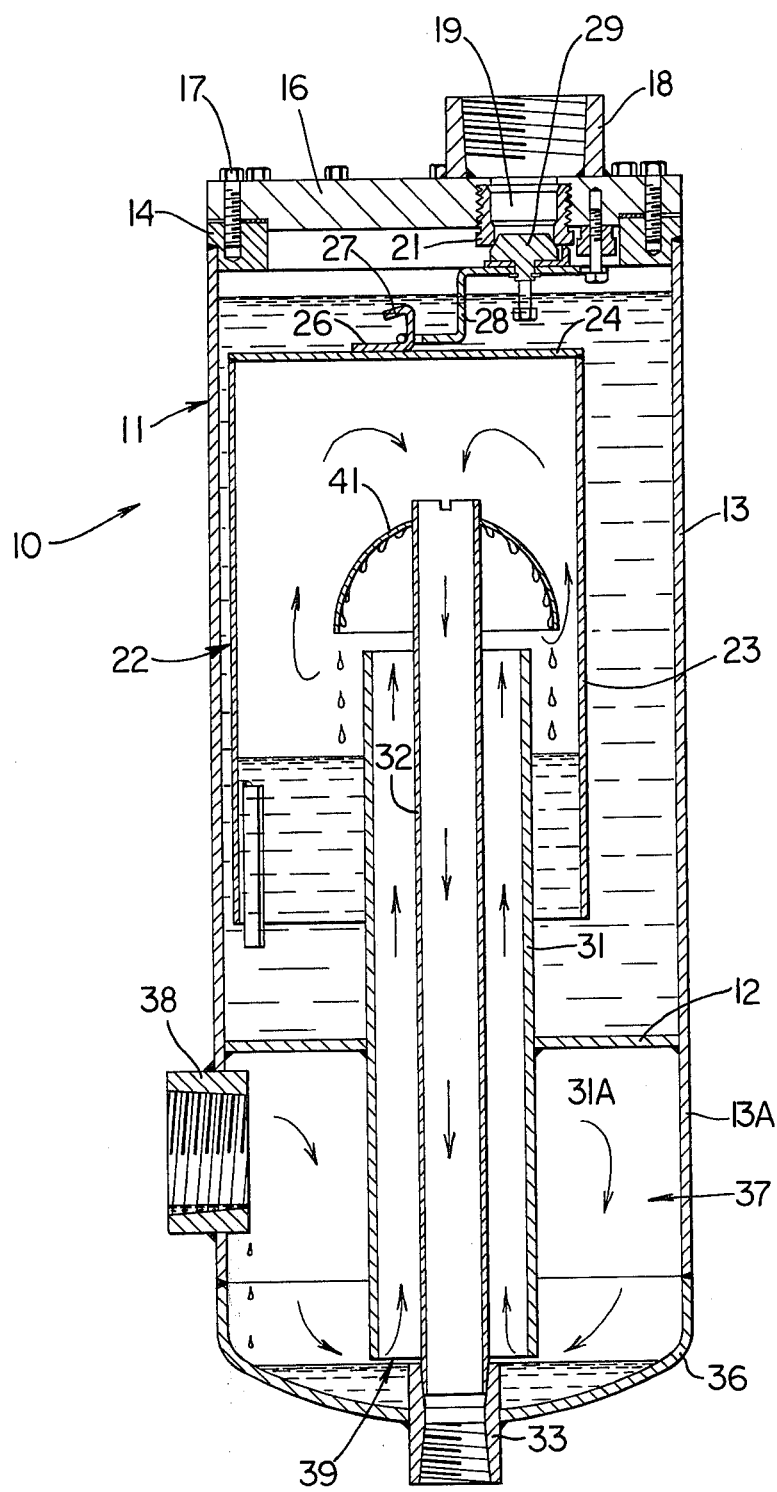

CONDENSATE CONTROLLER

BACKGROUND OF THE INVENTION

1. Field of the Invention

This invention relates to a condensate controller for use in drainage systems for steam utilizing equipment.

2. Description of the Prior Art

U.S. Pat. No. 3,828,843 discloses an inverted bucket-type steam trap modified by the provision of an additional fixed conduit (sometimes called a blow-thru tube) disposed inside of the conventional vertical inlet tube that is used for admitting steam and condensate into the inverted bucket of the steam trap. The upper end of the additional fixed conduit is located inside the inverted bucket at a vertical level above the upper end of the conventional inlet tube. The lower end of the additional fixed conduit is located outside of the casing of the steam trap and is adapted for connection to a vapor discharge line. The additional fixed conduit provides for the continuous discharge of vapor, substantially free of liquid, from the trap. It is conventional to provide an adjustable valve, such as a needle valve, in the vapor discharge line to control the rate of flow of the vapor through the additional fixed conduit. The purpose of the additional fixed conduit is to continuously discharge, at an adjustable controllable rate, a vapor stream of non-condensable gases, flash steam and, perhaps, a limited amount of live steam, from the trap. On the other hand, the condensate is discharged from the trap, intermittently and separately from the vapor stream, by the normal conventional operation of the inverted bucket steam trap. This separate discharge of condensate and vapor provides important advantages in the operation of the steam-utilizing load devices.

However, certain difficulties have been encountered with the prior structure. For example, the condensate must rise to a level close enough to the lower end of the vertical inlet tube so that the condensate can be picked up and lifted up the inlet tube by the vapor flow, which is constant. Thus, the horizontal inlet pipe line to the condensate controller may continually contain a high level of condensate therein, which is undesirable. Further, the prior structure provided for direct flow of the condensate and vapor from the inlet pipe line into the inverted bucket and it sometimes happened that pressure surges and other abnormalities in the steam system upstream of the condensate controller caused shocks or other violent stresses to be applied on the trap components which caused damage or accelerated wear.

Another problem is that the prior structure did not adequately separate liquid from the vapor that continuously flows through the blow-thru tube. Thus, some liquid was carried along with the vapor into the blow-thru tube. This is undesirable, particularly when the blow-thru vapor is used as a feed to another steam-using process downstream of the condensate controller.

Accordingly, it is an object of this invention to provide an improved condensate controller comprising an inverted bucket steam trap equipped with a blow-thru tube, wherein the inlet pipe line to the trap can be drained to a lower liquid level than has been possible heretofore and in which there is provided a gas or vapor space between the inlet pipe line and the inlet tube to the inverted bucket to ameliorate the effects of pressure abnormalities in the inlet pipe line.

It is a further object of the invention to provide an improved condensate controller, as aforesaid, which is provided with improved means to prevent liquid carry-over into the vapor flowing through the blow-thru tube.

BRIEF DESCRIPTION OF THE DRAWING

The drawing is a vertical central sectional view of the condensate controller.

SUMMARY OF THE INVENTION

According to the invention, there is provided a condensate controller comprising an inverted bucket steam trap equipped with a blow-thru tube, in which there is provided, below the bottom wall of the steam trap, a chamber providing a vapor space. The lower end of the inlet tube of the trap preferably extends close to the bottom of the vapor space. The inlet pipe line is connected to the chamber close to the upper end thereof. A concavo-convex deflector is mounted above the upper end of the inlet tube of the trap to deflect liquid in the incoming vapor-liquid stream into the pool of condensate in the trap so that the stream that flows through the blow-thru tube is substantially free of liquid.

DESCRIPTION OF A PREFERRED EMBODIMENT

The condensate controller 10 illustrated in the drawing is comprised of an exterior casing 11 having a bottom wall 12, a cylindrical side wall 13, a mounting flange 14 secured, as by welding, to the upper end of the side wall and a cover plate 16 secured to the flange 14 by bolts 17. A fitting 18 is secured, as by welding, to the upper surface of the cover plate 16. The fitting 18 communicates with an opening 19 in the cover plate. A valve seat member 21 is disposed in the opening 19. The fitting 18 is adapted to be connected to a condensate discharge line (not shown).

An inverted bucket 22 is disposed inside the casing 11. The bucket 22 has a cylindrical side wall 23 and a flat top wall 24. A connector 26 is secured to the upper surface of the top wall 24 and it has a hook portion 27 projecting upwardly therefrom. An operating lever 28 is coupled to the hook portion 27 and it has a valve element 29 thereon which is adapted to be moved into and out of sealing engagement with the valve seat defined by the lower edge of the valve seat member 21, in response to the vertical position of the inverted bucket 22 in the casing in a conventional manner.

An inlet tube 31 extends vertically upwardly from the bottom wall 12 into the inverted bucket 22. A blow-thru tube 32 is substantially coaxially disposed within the inlet tube 31 and is radially spaced therefrom to provide an annular space through which steam and condensate can flow upwardly into the inverted bucket 22. The upper end of the blow-thru tube 32 is positioned above the upper end of inlet tube 31. The blow-thru tube 32 extends downwardly and its lower end is connected to a fitting 33 which in turn can be connected to a vapor discharge line (not shown). The blow-thru tube 32 provides for the continuous flow of vapor (not-condensible gases, flash steam and live steam) downwardly and out of the condensate controller in all positions of the inverted bucket 22 within the casing 11.

The inverted bucket 22 has sufficient weight to pull the operating lever 28 downwardly and consequently pull the valve element 29 out of sealing engagement with the valve seat member 21 when an insufficient amount of steam is present inside the inverted bucket 22 and it is required to discharge condensate. However, when a sufficient amount of steam collects in the upper end of the bucket 22 to impart buoyancy thereto, the bucket will rise and will close the valve element 29 against the valve seat. Because vapor is continuously discharged, at an adjustable controllable rate, through blow-thru tube 32, the bucket will tend to remain down and the condensate discharge valve will be open in the normal operation of the load system, during which operation relatively large amounts of condensate are formed. For periods of light loading of the load system, during which a lesser amount of condensate is formed, a larger amount of steam will reach the bucket 22, the bucket will float more and the condensate discharge valve will close more and the functioning of the condensate controller will be more nearly like that of conventional inverted bucket steam traps (without the blow-thru tube).

As thus far described, the condensate controller is constructed and operates in the same manner as the prior art and further details of the operation are believed to be unnecessary because they are well known. It will be understood that a variety of known designs of condensate control valves, operating levers therefor, etc. can be used in place of the specific structures illustrated in the drawing.

According to the invention, there is provided a closed chamber defining a vapor space below the bottom wall 12. In the illustrated embodiment, the chamber is provided by extending the side wall 13 below the bottom wall 12 to provide a side wall extension 13A that extends downwardly from the bottom wall 12 and a dome-shaped cover 36 closing the lower end of the side wall extension, whereby to provide a closed chamber 37 below said bottom wall 12. A fitting 38 adapted for connection to the inlet pipe line (now shown) penetrates the side wall extension 13A as close as possible to the bottom wall 12. Further, the fitting 33 penetrates the central portion of the cover 36 and said fitting is sealingly attached to the lower end of the blow-thru tube 32. Moreover the inlet tube 31 preferably has an extension 31A that extends downwardly from the bottom wall 12 to a position close to, but spaced upwardly from, the bottommost portion of the dome-shaped cover 36 to provide a passage 39 for entry of vapor and condensate into the inlet tube 31. It will be noted that the lower end of inlet tube extension 31A is located below the lower edge of fitting 38. The steam and condensate that flows in through the fitting 38 will enter the chamber 37 and the condensate will drop downwardly to the bottom of the chamber 37. The condensate will accumulate as a pool thereat until the upper level of the pool becomes close to the lower end of the inlet tube extension 31A. At some point, the steam pressure will be sufficient to pick up and lift portions of the condensate through the inlet tube extension 31A, thence through the inlet tube 31 and into the bucket 22. It is noted that the steam flow into the inlet tube will be constant. Thus, the condensate can be substantially completely drained from the horizontal inlet pipe line connected to fitting 38 so that said pipe line does not contain large amounts of condensate. This will significantly improve drainage of condensate from the upstream steam-utilizing devices, which is a fundamental purpose of this apparatus. Further, the chamber 37, above the pool of condensate therein, provides a pressure accumulator and cushioning effect and it will at least partially absorb any sudden pressure changes that occur upstream in the system whereby to maintain more uniform pressure conditions within the condensate controller and thereby protect the mechanism from damage or accelerated wear. The volume of the chamber 37 can be selected to sufficiently provide the required pressure surge-absorbing effect. In a typical case, the volume of the chamber 37 can be of the same order of magnitude as the volume of the inverted bucket 22, or larger.

Further there is attached to the blow-thru tube 32, as close as possible to the upper end thereof, an annular concavo-convex or umbrella-shaped plate 41. The concave side of plate 41 opens downwardly toward and is disposed in confronting relationship to the upper end of the annular space between the blow-thru tube 32 and the inlet tube 31. The radially outer and axially lower edge of the plate 41 is disposed radially outwardly and spaced upwardly from the upper edge of the inlet tube. Thus, the mixture of vapor and condensate flowing up through the tube 31 will impinge against the concave surface of the plate 41. Although complex turbulent conditions will exist in the vicinity of the concave surface of the plate 41, in general, due to the effects of gravity the condensate will move down said concave surface and drop into the pool of condensate therebelow, whereas the vapor will escape around the lower edge of said concave surface and then move upwardly into the upper end of the inverted bucket. These vapors can then be discharged at a controlled rate through the blow-thru tube 32. Tests have confirmed that the vapor that flows through the blow-thru tube 32 using the concavo-convex deflector 41, which as illustrated in the drawing has a shape approximating a half spherical shell, contains significantly less condensate than is the case when no deflector is used or when a flat deflector is used. Thus, the concavo-convex deflector provides a blow-thru steam of significantly higher quality which can effectively be used as a feed to another steam-using process.

An additional advantage of the invention is that the extension 31A of the inlet tube encircles the lower end of the blow-thru tube 32 and protects it, so that the incoming steam and condensate flowing in through fitting 38 does not directly impinge on said blow-thru tube. This is advantageous because the blow-thru tube is normally made of relatively thin-walled stock and is more fragile than the inlet tube 31.

The embodiments of the invention in which an exclusive property or privilege is claimed are defined as follows:

1. In a condensate controller comprising a casing having a bottom wall, a side wall and a top wall and defining a closed compartment, an inverted bucket vertically movable inside the compartment, a condensate discharge valve in the top wall of the compartment, valve operating means connected to said bucket for opening and closing the valve in response to the vertical position of said bucket in said compartment, an inlet conduit for vapor and condensate extending upwardly through said bottom wall into the bucket and a blow-thru conduit extending upwardly through said bottom wall into the bucket to a position above the upper end of said inlet conduit whereby vapor can continuously escape from the bucket regardless of the vertical position of the bucket in the compartment, the improvement which comprises: wall means defining a closed chamber connected to said casing and located below the bottom wall thereof, an inlet connection for supplying vapor and condensate into the upper end of said chamber, said chamber defining a vapor space for absorbing pressure surges in the pressure of the vapor and condensate fed into said chamber, said inlet conduit extending downwardly through said chamber to a location close to, but spaced upwardly from, the lower end of said chamber, the lower end of said inlet conduit defining an opening providing the sole communication between said chamber and the interior of said inlet conduit, said opening as defined at the lower end of said inlet conduit being located below said inlet connection so that the vapor and condensate entering through said inlet connection flow downwardly to the lower end of said chamber and then the vapor flows upwardly through said opening into said inlet conduit and carries with it portions of condensate whereby to maintain the level of condensate in said chamber close to the lower end of said inlet conduit, said blow-thru conduit extending through the lower end of said chamber for discharging outside the chamber the vapor that flows through said blow-thru conduit, and a flow-impingement plate positioned adjacent the upper end of said inlet at an elevation below the upper end of said blow-thru conduit, said plate having a lower concave surface opening downwardly and being disposed in confronting relationship to the open upper end of said inlet conduit, the lower and radially outer edge of said concave surface being disposed radially outwardly of the upper edge of said inlet conduit.

2. A condensate controller as claimed in claim 1, in which said wall means comprises a side wall comprising an extension of said side wall of said casing and a cover closing the lower end of said side wall of said chamber, said chamber side wall having a first fitting defining said inlet connection for supplying vapor and condensate to said chamber at a location above said cover, said cover having a second fitting secured therein and connected to the lower end of said blow-thru conduit.

3. A condensate controller as claimed in claim 1 in which said blow-thru conduit extends lengthwise within said inlet conduit and is radially spaced therefrom to define an annular flow passage for flowing the vapor and condensate into said bucket.

4. A condensate controller as claimed in claim 3, wherein said flow-impingement plate comprises an annular plate mounted on the upper end of said blow-thru conduit with its concave side opening downwardly and being disposed in confronting relationship to the open upper end of said inlet conduit.

5. In a condensate controller comprising a casing defining a chamber, an inverted bucket vertically movable inside the chamber, a condensate discharge valve at the upper end of the chamber, valve operating means connected to said bucket for opening and closing the valve in response to the vertical position of said bucket in said chamber, an inlet conduit for vapor and condensate extending upwardly into the bucket, and a blow-thru conduit concentrically positioned within the inlet conduit and extending upwardly into the bucket to a position above the upper end of said inlet conduit whereby vapor can continuously escape from the bucket regardless of the vertical position of the bucket in the chamber, the improvement which comprises an annular concavo-convex plate mounted on said blow-thru conduit adjacent the upper end thereof, said plate having a shape approximating a half spherical shell with its concave side opening downwardly and being disposed in confronting relationship to the open upper end of said inlet conduit, the lower and radially outer edge of said concave side being disposed radially outwardly of and only slightly above the upper edge of said inlet conduit.

* * * * *

UNITED STATES PATENT AND TRADEMARK OFFICE
CERTIFICATE OF CORRECTION

PATENT NO. : 4 096 876
DATED : June 27, 1978
INVENTOR(S) : Otho E. Ulrich

It is certified that error appears in the above–identified patent and that said Letters Patent are hereby corrected as shown below:

Column 5, line 20; after "inlet" insert ---conduit---.

Signed and Sealed this

Fifteenth Day of May 1979

[SEAL]

Attest:

RUTH C. MASON
Attesting Officer

DONALD W. BANNER
Commissioner of Patents and Trademarks